US 12,483,385 B2

(12) United States Patent
Locher et al.

(10) Patent No.: US 12,483,385 B2
(45) Date of Patent: Nov. 25, 2025

(54) VERIFIABLE ANALYTICS PLATFORM WITH SMART CONTRACTS

(71) Applicant: ABB Schweiz AG, Baden (CH)

(72) Inventors: Thomas Locher, Zurich (CH); Carsten Franke, Stetten (CH); Sebastian Obermeier, Rietheim (CH); Yvonne-Anne Pignolet, Zurich (CH)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 16/743,521

(22) Filed: Jan. 15, 2020

(65) Prior Publication Data

US 2020/0228324 A1 Jul. 16, 2020

(30) Foreign Application Priority Data

Jan. 15, 2019 (EP) .................................. 19151904

(51) Int. Cl.
*H04L 9/06* (2006.01)
*H04L 9/00* (2022.01)
(Continued)

(52) U.S. Cl.
CPC .......... *H04L 9/0643* (2013.01); *H04L 9/3271* (2013.01); *H04L 67/104* (2013.01); *H04L 9/50* (2022.05)

(58) Field of Classification Search
CPC ... H04L 9/0643; H04L 9/3271; H04L 67/104; H04L 2209/38; G06Q 2220/00; G06Q 20/405; G06Q 20/065; G06Q 20/08; G06Q 20/382; G06Q 20/3827; G06Q 20/3829; G06Q 20/389; G06Q 40/04
See application file for complete search history.

(56) References Cited

U.S. PATENT DOCUMENTS

2005/0235150 A1 10/2005 Kaler et al.
2016/0328713 A1* 11/2016 Ebrahimi ......... G06K 19/06028
(Continued)

FOREIGN PATENT DOCUMENTS

CN 104412273 A 3/2015
CN 105791321 A 7/2016
(Continued)

OTHER PUBLICATIONS

European Patent Office, Extended Search Report issued in corresponding Application No. 19151904.0, mailed Aug. 1, 2019, 2019, 7 pp.

*Primary Examiner* — Taghi T Arani
*Assistant Examiner* — Blake I Narramore
(74) *Attorney, Agent, or Firm* — Greenberg Traurig, LLP

(57) ABSTRACT

A method for offering data with objects to be performed on the basis of the data, providing solutions to the problems and verifying the provided solutions. The method including the steps of providing a digital platform; uploading the data with the object as challenge to the platform; uploading a smart contract relating to the challenge to the platform; transferring the challenge from the platform to at least one solution provider; uploading a signed hash of the solution provider's solution of the challenge to the platform; uploading the solution provider's solution of the challenge to the platform; and evaluating at the platform the uploaded solution based on predefined conditions.

20 Claims, 1 Drawing Sheet

(51) Int. Cl.
  *H04L 9/32*      (2006.01)
  *H04L 67/104*    (2022.01)

(56) References Cited

U.S. PATENT DOCUMENTS

| | | | |
|---|---|---|---|
| 2016/0342977 A1* | 11/2016 | Lam | G06Q 20/0658 |
| 2017/0034197 A1* | 2/2017 | Daniel | H04L 9/3236 |
| 2017/0180829 A1* | 6/2017 | Schwarzkopf | H04Q 9/00 |
| 2017/0287090 A1* | 10/2017 | Hunn | G06Q 50/18 |
| 2017/0344988 A1* | 11/2017 | Cusden | H04L 63/12 |
| 2018/0012433 A1* | 1/2018 | Ricci | A61B 5/1176 |
| 2018/0091596 A1* | 3/2018 | Alvarez | H04L 67/12 |
| 2018/0197172 A1 | 7/2018 | Coburn et al. | |
| 2018/0218176 A1 | 8/2018 | Voorhees et al. | |
| 2018/0220278 A1* | 8/2018 | Tal | G06Q 20/36 |
| 2018/0337769 A1* | 11/2018 | Gleichauf | G06Q 20/0655 |
| 2019/0043025 A1* | 2/2019 | Martirosyan | H04L 9/088 |
| 2019/0095880 A1* | 3/2019 | Glover | G06F 16/1805 |
| 2019/0156429 A1* | 5/2019 | Beckmann | G06Q 20/3827 |
| 2019/0163672 A1* | 5/2019 | Shmueli | G06F 16/1824 |
| 2019/0164156 A1* | 5/2019 | Lindemann | G06Q 20/3829 |
| 2019/0207750 A1* | 7/2019 | Harvey | H04L 9/0637 |
| 2019/0280864 A1* | 9/2019 | Cheng | H04L 9/30 |
| 2019/0294136 A1* | 9/2019 | Iacobone | G08B 19/005 |
| 2019/0372786 A1* | 12/2019 | Ra | H04L 9/3234 |
| 2020/0058023 A1* | 2/2020 | Travizano | H04L 9/3239 |
| 2020/0151712 A1* | 5/2020 | Felten | H04L 9/3247 |
| 2020/0160334 A1* | 5/2020 | Alba | H04L 9/0637 |
| 2020/0193425 A1* | 6/2020 | Ferenczi | G06Q 20/3827 |
| 2020/0195497 A1* | 6/2020 | Obaidi | G06F 9/45558 |

FOREIGN PATENT DOCUMENTS

| | | | | |
|---|---|---|---|---|
| CN | 107851111 A | 3/2018 | | |
| CN | 108282334 A | 7/2018 | | |
| CN | 108647951 A | 10/2018 | | |
| CN | 108737361 A | 11/2018 | | |
| WO | WO-2017098519 A1 * | 6/2017 | | G06Q 20/382 |
| WO | 2017153495 A1 | 9/2017 | | |

* cited by examiner

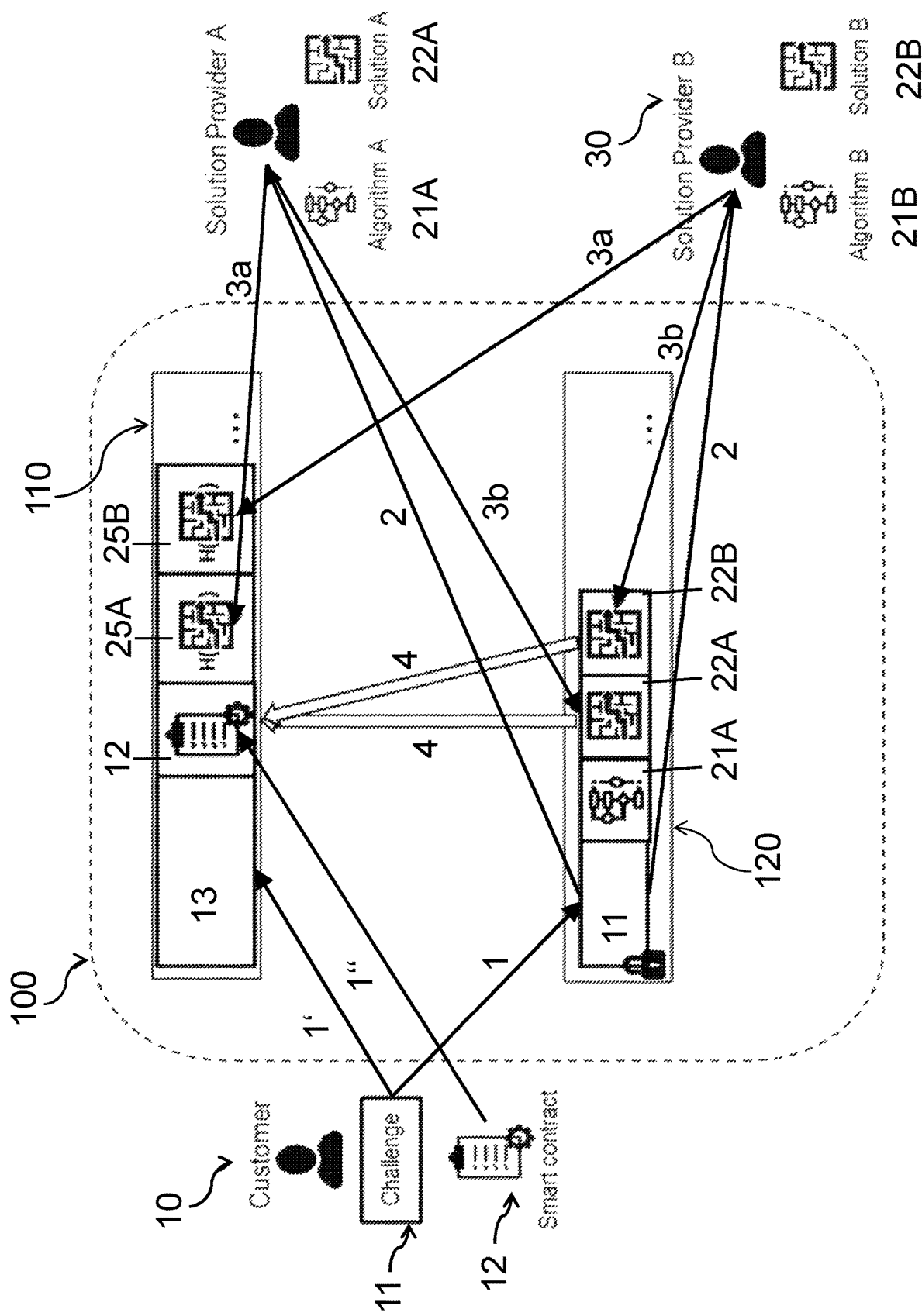

VERIFIABLE ANALYTICS PLATFORM WITH SMART CONTRACTS

FIELD OF THE INVENTION

The invention relates to methods, devices and systems for a verifiable analytics platform with smart contracts. In particular, the present invention provides a framework, preferably a digital platform which allows the exchange of data and execution of smart contracts between a plurality of parties.

BACKGROUND OF THE INVENTION

When companies or its customers require algorithmic solutions to specific data science and machine learning problems, this currently involves many meetings and contract negotiations with potential solution providers, before they can even start working on the data. In particular, there are presently no good contractual frameworks for the evaluation of the solution providers' provided work without needing either a) the company or the customer to reveal the data and the algorithm it is being evaluated on or b) a high trust level on the solution providers' side that the company or its customers will pay them correctly.

For example, some companies provide a centralized platform "in the cloud", where their customers can upload their data. This platform is open to third parties that can supply software modules operating on the customer-provided data for the platform. It is a difficult challenge for the customers to select the right third party and evaluate the quality of their provided algorithms.

There exist also platforms in the form of market places which offer storage, computer farms, data providers, web hosting, SaaS (Software as a Service) applications, and all making business to others through smart contracts using Proof of Contribution (PoCo) techniques. These techniques are very general and do not provide support for the kind of specific challenges.

There exist also Ethereum-based platforms to distribute work and to verify computations within a decentralized network. To mitigate attacks on the network by internal and external actors, a combination of incentives and free market principles is used. The protocol is utilizing a general-purpose blockchain as well as other more established forms of network communication. Arbitration between network participants is realized using smart contracts.

SUMMARY

It is an objective of the invention to provide a method and system which allows parties to upload data, preferably combined with challenges and allows other parties to provide solutions for the data and challenges.

The object of the invention is achieved by the features of the independent claims. Further preferred embodiments of the invention are defined in the dependent claims.

In particular, the present invention provides a method and system, preferably in the form of a platform, which allows a first party (in the following also called "Customer") to upload sensitive data and associated challenges to the platform. The Platform is preferably provided by a second party (in the following also called "Provider"). Third parties (in the following also called "Solution Provider") may provide their solutions on the challenges on the platform without violation of privacy demands.

The present invention preferably provides a platform on which computational challenges can be offered and solutions for said challenges can be efficiently and suitably evaluated. Said evaluation of the provided solutions also allows appropriate payment. According to the present invention, the offering of a challenge, the evaluation of a solution and/or any appropriate payment can be regulated by using a smart contract. Complicated and time consuming negotiations can therefore be avoided.

According to the present invention, a first party, e.g. a company, could host a digital platform. In other words, the present invention can be implemented in a centralized approach, by providing the platform under the control of a first party. The platform, however, is not necessarily provided on a single host or executed on a single host. The centralized implementation can also be provided by cloud computing. The present invention may even be realized on the basis of a decentralized approach.

Hence, the present invention may be realised in a distributed computing environment which comprises a plurality of hosts, at least one networked client (e.g. a smartphone) and a server, storage or processing resources of a computer cloud, devices in a peer-to-peer network performing file sharing, or on the basis of a distributed ledger, e.g., using a blockchain.

An essential feature of the present invention, however, is based on the use of smart contract functionality, irrespective of whether the platform is based on a centralized or decentralized approach. In particular, the digital platform with the additional smart contract functionality can be used as a marketplace for data science and/or machine learning solutions tackling customer-defined challenges in a transparent, yet privacy-preserving fashion, which enables interactions between additional parties, e.g., customers and solution providers, without requiring trust.

Preferably, smart contracts enforce the exchange of data and computed solutions. The present invention provides the advantage that the quality of the solution providers' algorithms can be evaluated before accepting them. It is further advantageous that the platform of the present invention can be extended to allow performance-based payments among the customers, solution providers and/or the host of the digital platform. The present approach is vastly different from the current methods known in the art.

The system and method of the present invention preferably provides at least one of the following preferred advantages. Firstly, the present method and system allow automated interactions between customers and solution providers, thus manual interactions of the provider of the platform can be reduced or even avoided. The performance of the provided algorithms can be evaluated within the platform, such that the customer can select a desired solution and/or a solution provider. The system and method further allow performance-based payments. Hence, less manual work for the whole process is necessary, leading to fewer errors and misinterpretations, and lower development and engineering costs. Thus, the invention can result in a significant work and therefore cost reduction.

The system and method of the present invention further provides advantages regarding quality. In particular, the platform of the present invention can be configured such that a third-party solution provider has to prove that their solution works beforehand, allowing the customer to select a digital solution provider with guaranteed quality attributes.

The system and method of the present invention further provide advantages regarding security. For instance, customers can control access to their data and are thus inclined to participate in the marketplace, thereby enriching the marketplace with more options.

Solution providers do not need to trust their customers due to the transparency of the marketplace and automated payments.

According to a further preferred embodiment, the present invention relates to a computer readable medium including the computer program code for performing the steps of the method of the invention, e.g., as discussed above or claimed in the claims.

In particular, the present invention provides a method for offering data with objects to be performed on the basis of said data, providing solutions to said problems and verifying the provided solutions, the method comprising the steps:
   providing a digital platform;
   uploading the data with the object as challenge to the platform;
   uploading a smart contract relating to said challenge to the platform;
   transferring the challenge from the platform to at least one solution provider;
   uploading a hash, preferably a signed hash of the solution provider's solution of the challenge (11) to the platform;
   uploading the solution provider's solution of the challenge to the platform; and
   evaluating at the platform the uploaded solution based on predefined conditions.

The challenge is preferably stored in a storage means provided at the platform. Said challenge may be stored in encrypted, unencrypted and/or partially encrypted form. The challenge is preferably transferred to the platform together with its hash and/or predefined conditions, wherein said predefined conditions are preferably determined in a smart contract.

According to a further preferred embodiment, the challenge with its hash and the smart contract is preferably stored in a distributed ledger, i.e., a decentralized database. The distributed ledger may be provided on a plurality of hosts, preferably on a peer-to-peer network. Moreover, the distributed ledger is preferably a blockchain.

The platform further allows solution providers to transfer their algorithmic solution of the challenge to the platform. The providers may upload their solution either with or without the corresponding algorithm.

The present invention also relates to the platform for execution of the above mentioned method steps. In particular, the present invention provides a platform which allows offering data with objects to be performed on the basis of said data, for providing solutions to said problems and for verifying the provided solutions. The platform is adapted to execute the method steps of receiving the data with the object as challenge at the platform; receiving a smart contract relating to said challenge at the platform; transferring the challenge from the platform to at least one solution provider; receiving a hash of the solution provider's solution of the challenge at the platform; receiving the solution provider's solution of the challenge at the platform; and evaluating at the platform the uploaded solution based on predefined conditions.

In another aspect, the invention provides a computer program comprising instructions to cause a platform to execute the above mentioned method steps.

In another aspect, the invention provides a computer-readable medium having stored thereon the computer program.

A smart contract is a computer protocol intended to digitally facilitate, verify, or enforce the negotiation or performance of a contract. Smart contracts allow the performance of credible transactions without third parties. These transactions are trackable and irreversible.

A challenge of the present invention is preferably a combination of data with a description of the data and the problem for which a solution is required.

"Data science" is known as an interdisciplinary field that uses scientific methods, processes, algorithms and systems to extract knowledge and insights from data in various forms, both structured and unstructured. In other words, data science may be seen as a "concept to unify statistics, data analysis, machine learning and their related methods" in order to "understand and analyze actual phenomena" with data. It preferably employs techniques and theories drawn from many fields within the context of mathematics, statistics, information science, and computer science.

BRIEF DESCRIPTION OF THE DRAWINGS

The subject-matter of the invention will be explained in more detail with reference to a preferred exemplary embodiment which is illustrated in the attached drawing:

FIG. 1 schematically shows a platform according to the present invention with a customer and two solution providers.

DETAILED DESCRIPTION OF EMBODIMENTS

An exemplary embodiment of the invention will be described with reference to FIG. 1 in which identical or similar reference signs designate identical or similar elements.

A digital platform 100 according to the present invention is provided by a provider, e.g., by a company (a second party). This platform 100 allows at least one first party (customer 10) to provide at least one challenge and other parties (third parties; Solution providers A, B) to provide solutions to such challenges in a safe and verifiable way.

In a first step 1, a first party provides some data and defines the problem to be solved in the form of a description. Said information is transferred in a first step 1 to the platform 100 (see arrows 1 in FIG. 1). For instance, the first party (e.g. customer 10) provides certain data, describes the problem/object (description) for which the customer 10 wants to have a solution and any evaluation criteria. Preferably, the customer 10 provides only a (small) subset of data as a test sample. According to the present invention, the description of the problem/object and the data together form a challenge 11, wherein said challenge 11 is transferred to the platform 100.

The challenge 11 can be uploaded to the platform 100 or merely a link to the challenge is provided to the platform 100, i.e., only the link is uploaded to the platform 100. According to another implementation, at least one of data, description and/or evaluation criteria can be uploaded, wherein the remaining information is provided via a link. For the sake of simplicity, the present application uses the term uploading for uploading "data" and/or a link.

The challenge 11 is preferably stored at storage means 120 at the platform 100. Said description and/or data can be stored either in i) plaintext or in ii) encrypted form. The padlock symbol in FIG. 1 indicates that the description and data (the challenge 11) is stored in encrypted form. Moreover, storing a hybrid version of the challenge is also possible, e.g., storing the description in plaintext and the data in encrypted form or vice versa.

According to a preferred embodiment, a record with a hash 13 of the challenge 11 will be additionally transferred (see step 1') to the platform 100. A "record" is preferably a data entry in a database, such as the (encoding of the) challenge and/or the corresponding hash.

It is additionally preferred that also a record containing predefined conditions is transferred to the platform 100. Preferably, a smart contract 12 will be used for containing said predefined conditions, which provides several advantages as discussed in further detail below. Hence, it is preferred to upload 1" said smart contract 12 to the platform 100.

According to a preferred embodiment, the smart contract 12 and/or the hash 13 of the challenge are stored on the platform 110. According to another preferred embodiment, the smart contract 12 and the hash 13 are stored on a distributed ledger 110. Such a distributed ledger 110 can be provided similar to a blockchain or can be provided as blockchain. In other words, the distributed ledger 110 may be provided on the system 100 but additionally on other hosts, preferably in a peer-to-peer network. The distributed ledger 110 solves, i.a., a problem in case there are many mutually distrusting parties by imposing a common shared state and consensus algorithm. In other words, the distributed ledger is a substitute for a universally trusted central entity. Of course, it also provides fault tolerance as a further desirable property.

In other words, the distributed ledger or distributed ledger database is spread across several nodes (devices) on a peer-to-peer network, where each node replicates and saves an identical copy of the ledger and updates itself independently. The primary advantage is the lack of central authority. When a ledger update happens, each node constructs the new transaction, and then the nodes vote using a shared consensus algorithm on which copy is correct. Once a consensus has been determined, all the other nodes update themselves with the new, correct copy of the ledger. Security is accomplished through cryptographic keys and signatures, preferably on the basis of a private and public key system.

According to a preferred embodiment of the present invention, the distributed ledger 110 is a blockchain. Blockchain is a technology that allows multiple parties to share a common, append-only database. This is preferably useful for enabling transactions between parties or individuals without relying on an intermediary, by creating a transparent, time-stamped history of every transaction. The database grows larger with every new transaction and must be stored in multiple locations, however, this is often cheaper than paying a trusted intermediary to operate a centralized database, and it is also highly resilient because there is no single point of failure.

The blockchain technology is a decentralized system for managing security and information. This is fundamentally different from most existing solutions where data is kept and managed within a central system, with security built around it, rather than within it.

The term blockchain is typically also used to describe an implementation of a blockchain network. In other words, a blockchain provides a distributed, shared state that all participants agree on using a consensus algorithm.

By storing the challenge 11 at the platform 100, third parties, e.g. solution providers 20A and 20B, can access said challenge 11 (see subsequent step 2). Preferably, the solution providers A and B download the challenge 11 to develop appropriate algorithms and corresponding solutions at their sites. For instance, solution providers 20A, 20B can search the platform 10 for challenges to tackle. According to a further embodiment of the present invention, the customer 10 may contact preferred solution providers 20A, 20B and provide a key or a plurality of keys available to them, such that the preferred solution providers 20A, 20B can access and download the respective challenge 11 with said key(s) at/from the platform 100. In yet another embodiment, the solution providers 20A, 20B can search the platform 100 for problems to solve but need the approval of the customer 10 before obtaining access to the data.

Next, in step 3, after the solution providers 20A, 20B in turn devised a suitable solution for the customer challenge 11, the solution providers 20A, 20B first upload 3a a signed hash 25A, 25B of their solution to the platform 110, preferably to the distributed ledger 110. When it has been confirmed that this hash or these hashes 25A, 25B are available at the platform or the distributed ledger, the solution 22A, 22B itself is uploaded 3b to the storage 120 at the platform 100. Preferably, the storage of the solution in the storage 120 triggers the execution of the corresponding smart contract 12. In addition to the solution, the respective algorithm 21A may be uploaded to the platform 100 and stored in storage 120. The preceding submission (step 3a) of the signed hash 25A, 25B provides the preferred advantage that the solution providers 20A, 20B are protected from malicious parties trying to claim the uploaded solution as their own.

In step 4, as part of the smart contract 13, evaluation criteria are applied and one or more solutions are chosen when a certain condition is met, e.g., a certain (calendar) time has been reached or time has passed since the posting of the challenge, a certain number of solutions has been collected, a solution whose performance reaches or exceeds a given threshold, or any combination of the above conditions.

The evaluation 4 can take several forms: If the solution provider's algorithm 21A, 21B is hosted on the platform 100 itself, the algorithm 21A can be executed directly (potential using parameters provided by the solution provider) to determine and verify the quality of the solution.

If the solution provider chooses not to provide its algorithm 21B to the platform 100, the challenge 11 must take the form of a task that is computationally hard to solve but easy to verify for the party 10 creating the challenge. There are multiple ways to achieve this, e.g., the problem itself may impose many constraints for which finding any or any good solution might be hard but verifying whether a given solution 22A, 22B satisfies all constraints can be computed efficiently. Alternatively, constructed problems where the creator of the challenge knows the best solution can be used. As an example, the creator can solve a supervised problem to derive the solution but post it as an unsupervised problem.

Once a solution or multiple solutions have been chosen, the corresponding solution providers 20A, 20B can optionally be remunerated directly and automatically as well. Depending on the evaluation criteria and the contract, also payments can be organized. For instance, remunerations or payments can have the following form:

a) fixed amount for solving the problem with a performance above a certain threshold;

b) fixed amount for solving the problem best among all solution providers;

c) amount is a function of the performance on the available data published in the challenge, d) amount is a function of the performance on a second data set being published after evaluating the same on a first data set (customer can commit to second data set without publishing it immediately, e) amount is a function of the performance on a data set that is only known by the customer/platform host (requires either (i) the solution providers to trust the customers/platform host or (ii) a mechanism by which the customer can prove that the performance on the unknown data set has been computed correctly, implemented with existing zero-knowledge proof concepts.

weighted versions of a)-e) where the weights depend on the performance of earlier challenges.

The kind of data and challenge according to the present invention is not restricted to a particular field. To be more concrete, the following example with a specific kind of data will be further illustrated.

A customer 10 may upload Smart Sensor vibration data of a device to the platform 100, which is provided by a service provider. Customer 10 would like to have a third party solution provider 20A, 20B to create algorithms for predicting when the device fails.

The solution provider 20A, 20B will get access to a part of the data 10, which are stored in storage 10 of the platform, such that the solution provider 20A, 20B can create an algorithm, preferably within said platform. After uploading the solution 22A, 22B and/or the algorithm 21A, 21B to the platform 100, the smart contract 12 then executes the different solutions on the data set for evaluation purposes. In addition to the technical evaluation, the platform may also be used for paying the solution provider(s) based on the contract criteria.

The present invention preferably provides further mechanisms, in order to keep the identity of the involved parties and/or the challenges private, to ensure that the solution works as required. For instance, zero-knowledge proof mechanisms, e.g., combined with random beacons, discussed in prior art can be used in combination with the present invention.

While the invention has been described in detail in the drawings and foregoing description, such description is to be considered illustrative or exemplary and not restrictive. Variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

The invention claimed is:

1. A method for offering data with problems to be performed on the basis of said data for which a solution is requested, providing solutions to said problems and verifying the provided solutions, the method comprising:

providing a digital platform having a storage and a distributed ledger;

receiving, by the digital platform from a first computing device, a challenge to the storage, the challenge comprising sensor data and a description of a problem/object for which the solution is requested based on the sensor data;

receiving, by the digital platform from the first computing device, a record with a hash of the challenge and a smart contract including predefined conditions relating to the challenge to the distributed ledger;

transferring, by the digital platform, the challenge from the storage to at least one second computing device of at least one solution provider;

receiving, by the digital platform from the at least one second computing device, a signed hash of the at least one solution provider's solution of the challenge to the distributed ledger during a first time period, wherein the signed hash associates the at least one solution provider's solution with a corresponding one of the at least one solution provider;

receiving the at least one solution provider's solution of the challenge to the storage during a second time period; and evaluating, at the digital platform, the at least one solution provider's solution received from the at least one second computing device based on the predefined conditions;

wherein the at least one solution provider's solution is an algorithmic solution to the challenge based on the sensor data;

wherein the second time period occurs after the first time period;

wherein the sensor data comprises operational data of a device, and wherein the challenge is predicting a device failure based on the sensor data.

2. The method of claim 1, wherein the sensor data comprises vibrational data for the device, and wherein the challenge is predicting the device failure based on the vibrational data.

3. The method of claim 1, wherein receiving the signed hash further comprises:

confirming that the signed hash of the at least one solution provider's solution is available at the distributed ledger.

4. The method of claim 1, wherein receiving the at least one solution provider's solution further comprises:

executing the smart contract stored in the distributed ledger.

5. The method of claim 1, wherein the distributed ledger is provided on a plurality of hosts on a peer-to-peer network.

6. The method of claim 1, wherein the distributed ledger is a blockchain.

7. The method of claim 1, wherein the algorithmic solution is uploaded together with the signed hash of the at least one solution provider's solution to the storage.

8. The method of claim 7, wherein receiving the signed hash of the at least one solution provider's solution protects the at least one solution provider from another solution provider claiming the uploaded solution of the at least one solution provider.

9. The method of claim 2, wherein the distributed ledger is provided on a plurality of hosts on a peer-to-peer network.

10. The method of claim 3, wherein the distributed ledger is provided on a plurality of hosts on a peer-to-peer network.

11. The method of claim 4, wherein the distributed ledger is provided on a plurality of hosts on a peer-to-peer network.

12. The method of claim 2, wherein the distributed ledger is a blockchain.

13. The method of claim 3, wherein the distributed ledger is a blockchain.

14. The method of claim 4, wherein the distributed ledger is a blockchain.

15. The method of claim 1, wherein the at least one solution provider comprises at least a first solution provider and a second solution provider.

16. The method of claim 1, wherein the challenge further comprises an evaluation criteria based on the predefined conditions, wherein the at least one solution provider's solution comprises a first solution provider's solution and a second solution provider's solution, and wherein the method further comprises:
applying the evaluation criteria to the first solution provider's solution and the second solution provider's solution and choosing at least one solution based on at least one of the predefined conditions being met.

17. The method of claim 16, wherein the predefined conditions include a certain time having passed since a posting of the challenge, a certain number of solutions having been collected, a solution's performance reaches or exceeds a given threshold, and any combination thereof.

18. The method of claim 7, further comprising:
applying the at least one solution provider's algorithmic solution directly to the challenge to determine and verify a quality of the at least one solution provider's algorithmic solution.

19. A platform including a processor, a storage comprising a non-transitory computer readable medium including a program comprising instructions executable by the processor, and a distributed ledger, the platform for offering data and a description of a problem/object to be performed on the basis of said data for which a solution is requested, for providing solutions to said problem/object, and for verifying the provided solutions, the platform being adapted to execute the method steps of:
receiving, from a computing device, a challenge to the storage, the challenge comprising sensor data and the description of the problem/object for which a solution is requested based on the sensor data;
receiving, from the computing device, a hash of the challenge and a smart contract including a predefined conditions relating to the challenge at the distributed ledger;
transferring the challenge from the storage to at least a first solution provider and a second solution provider;
receiving a signed hash of the first solution provider's solution and a signed hash of the second solution provider's solution of the challenge at the distributed ledger during a first time period;
wherein the signed hash of the first solution provider's solution associates the first solution provider's solution with the first solution provider and the signed hash of the second solution provider's solution associates the second solution provider's solution with the second solution provider;
receiving the first solution provider's solution and the second solution provider's solution of the challenge at the storage during a second time period; and
evaluating the first solution provider's solution and the second solution provider's solution based on the predefined conditions;
wherein the first solution provider's solution and the second solution provider's solution are algorithmic solutions to the challenge based on the sensor data;
wherein the second time period occurs after the first time period;
wherein the sensor data comprises operational data of a device, and wherein the challenge is predicting a device failure based on the sensor data.

20. A non-transitory computer readable medium including a program comprising instructions that when executed by a processing resource to cause a platform for offering data with problems to be performed on the basis of said data for which a solution is requested, for providing solutions to said problems and for verifying the provided solutions, comprising:
provide a digital platform having a storage and a distributed ledger;
upload a challenge to the storage, the challenge comprising sensor data and a description of a problem/object for which a solution is requested based on the sensor data from a computing device;
upload a smart contract relating to said challenge to the distributed ledger;
receive a smart contract relating to said challenge at the distributed ledger from the computing device;
transfer the challenge from the platform to at least a first solution provider and a second solution provider;
receive a signed hash of the first solution provider's solution and the second solution provider's solution of the challenge at the distributed ledger during respective first time periods,
wherein the signed hash associates the at least one solution provider's solution with a corresponding one of the at least one solution provider;
receive the first solution provider's solution and the second solution provider's solution of the challenge at the storage during respective second time periods; and
evaluate at the platform the first solution provider's solution and the second solution provider's solution based on predefined conditions;
wherein the first solution provider's solution and the second solution provider's solution are algorithmic solutions to the challenge based on the sensor data;
wherein the respective second time periods occur after the respective first time periods;
wherein the sensor data comprises operational data of a device, and wherein the challenge is predicting a device failure based on the sensor data.

* * * * *